United States Patent
Paschke

(10) Patent No.: US 11,123,155 B2
(45) Date of Patent: Sep. 21, 2021

(54) ULTRASONIC DENTAL TOOL WITH WEAR THRESHOLD INDICATOR, WEAR INDICATOR TOOL, AND METHOD OF DETERMINING TOOL WEAR

(71) Applicant: Ultrasonics Plus LLC, Missoula, MT (US)

(72) Inventor: Richard H. Paschke, Missoula, MT (US)

(73) Assignee: Paschke Ultrasonix LLC, Missoula, MT (US)

( * ) Notice: Subject to any disclaimer, the term of this patent is extended or adjusted under 35 U.S.C. 154(b) by 0 days.

(21) Appl. No.: 16/791,754

(22) Filed: Feb. 14, 2020

(65) Prior Publication Data

US 2020/0268481 A1 Aug. 27, 2020

Related U.S. Application Data

(60) Provisional application No. 62/808,334, filed on Feb. 21, 2019.

(51) Int. Cl.
*A61C 1/07* (2006.01)
*A61C 1/06* (2006.01)

(52) U.S. Cl.
CPC ............ *A61C 1/07* (2013.01); *A61C 1/06* (2013.01); *A61C 2201/002* (2013.01); *A61C 2204/007* (2013.01)

(58) Field of Classification Search
CPC .......... A61C 19/04; A61C 2204/007; A61C 2201/002; A61C 1/06; A61C 1/07; A61C 17/16–20; A61C 3/03
See application file for complete search history.

(56) References Cited

U.S. PATENT DOCUMENTS

| | | | | |
|---|---|---|---|---|
| 4,117,596 A | * | 10/1978 | Wallshein | A61C 7/12 433/9 |
| 4,505,675 A | * | 3/1985 | Albert | A61C 5/50 433/72 |
| 4,611,288 A | * | 9/1986 | Duret | A61C 5/77 700/163 |
| 4,708,651 A | * | 11/1987 | Buchanan | A61C 5/44 433/102 |
| 5,289,919 A | * | 3/1994 | Fischer | A61C 19/02 206/366 |

(Continued)

FOREIGN PATENT DOCUMENTS

JP 2014023826 A * 2/2014

*Primary Examiner* — Jacqueline T Johanas
*Assistant Examiner* — Shannel Nicole Belk
(74) *Attorney, Agent, or Firm* — Carter, DeLuca & Farrell LLP

(57) ABSTRACT

A dental ultrasonic tool configured to connect to a magnetostrictive or piezoelectric transducer of a dental instrument operating in the frequency range between 18 kHz and 50 kHz. The tool includes a tip and a singular surface marking having a minimum width of 0.5 mm disposed on the tip. The tip includes a distal point as a datum. The singular surface marking is spaced-apart from the distal point of the tip and defines at least one edge. The at least one edge is not coincident with a first flexural node of the tip at an operating frequency of the tip. Dental ultrasonic tip wear measurement tools for measuring the wear on a tip are also provided.

6 Claims, 5 Drawing Sheets

(56) References Cited

U.S. PATENT DOCUMENTS

| | | | |
|---|---|---|---|
| 6,413,086 B1* | 7/2002 | Womack | A61C 19/04 |
| | | | 33/513 |
| 9,904,996 B2 | 2/2018 | Vanbiervliet et al. | |
| 2015/0037748 A1* | 2/2015 | Rohner | A61C 19/10 |
| | | | 433/26 |
| 2016/0247270 A1* | 8/2016 | Vanbiervliet | A61C 17/18 |
| 2018/0140403 A1* | 5/2018 | Laurito | G01B 3/002 |
| 2018/0369609 A1* | 12/2018 | Wilder Smith | A61C 3/06 |
| 2019/0104983 A1* | 4/2019 | Hussein | A61B 5/4547 |
| 2020/0268481 A1* | 8/2020 | Paschke | A61C 1/07 |

\* cited by examiner

ULTRASONIC DENTAL TOOL WITH WEAR THRESHOLD INDICATOR, WEAR INDICATOR TOOL, AND METHOD OF DETERMINING TOOL WEAR

CROSS-REFERENCE TO RELATED APPLICATIONS

This application claims the benefit of, and priority to, U.S. Provisional Patent Application No. 62/808,334, filed on Feb. 21, 2019, the entire contents of which are incorporated herein by reference.

FIELD

The present disclosure is generally related to the physical measurement of the wear length of a dental tool. More specifically, the present disclosure relates to dental ultrasonic insert tips, wear indicator tools, and methods configured to facilitate accurate measurement of the wear of a dental ultrasonic insert tip.

BACKGROUND

Initial wear guides for dental ultrasonic insert tips were based on empirical data on tip stroke measurements of dental ultrasonic inserts that had a portion of the original length of the insert tip removed. The de facto standard described a loss of 25% efficiency and a loss of 50% efficiency when the dental ultrasonic insert tip length was reduced through wear of 1 mm and 2 mm, respectively. Early wear cards had graphic images representing the tips with lines showing 1 mm and 2 mm tip length reductions. Graphic images were later replaced by photographic images and both magnetostrictive and piezoelectric ultrasonic dental tool manufactures adopted the standard.

Current methods, used almost universally, require matching the profile of a tip of a dental ultrasonic insert against the photographic image on the wear card. This method requires the user to align the worn insert tips against the images, which in most cases do not have any datum or reference points. Once aligned, the user makes a judgement of where the point of the insert tip crosses a green line (new tip), a yellow line (25% reduction in efficiency), or a red line (50% reduction in efficiency). The recommendation is to reorder inserts when the worn tip crosses the yellow line, and to discard and replace an insert when the worn tip crosses the red line.

Over the years, changes have been made in measurement cards, but the basis for evaluation and accuracy have remained the same. Manufacturers have adopted the same efficiency loss with tip wear of 1 mm and 2 mm but since insert tip configurations vary from manufacturer to manufacturer, inserts from different manufacturers require different wear guide images. Thus, the wear guides are manufacturer specific. Further, many wear guide cards require multiple images for different insert tip styles. Any approach that uses an image of an insert tip must use an ideal representation of that particular tip design or style. As a result, errors are often encountered because manufactured insert tips will always include production variations including material spring-back, length differences due to swaging or stamping of tips, and/or other manufacturing variations.

Markings for wear indications based on the above descriptions also present challenges to designers and manufactures. Any wear markings placed over the first 2 mm of the inert tip would be worn off during normal dental treatments, since the first 2 mm are in an active tip stroke area. If the first 2 mm of the insert tip will wear, it is obvious that the outer surface of the tip would be the first to wear, thereby wearing off any markings. In addition, there is a risk of decreasing the mechanical strength of an insert tip whenever the marking is in the region of the first flexural node.

U.S. Pat. No. 9,904,996, for example, attempts to overcome the above-noted shortcomings by using digitally overlaid images of a worn tip being evaluated against a stored digital reference image. This measurement tool adds the complication of using an insert holder and requires a device to take a digital picture of the insert tip being tested. This approach is also limited in use to a single manufacturer. It is further limited because the stored images used for comparison represent an ideal tip length and bend angles, and do not account for manufacturing variations. Although it utilizes the same reference point for all tip measurements and comparisons, its reference datum location is at the mesial end of the insert tip, a point more than 20 mm away from the actual point being measured.

SUMMARY

The efficiency and ease of measuring dental ultrasonic insert tip wear are key determinants to compliance for using any measurement tool. Presently, the state of the art for measuring insert tip wear reveals a lack of a universal means for measuring tip wear, even within any manufacturer's product line. Further, the current state of the art does not provide a universal means to measure both magnetostrictive and piezoelectric inserts to determine tip wear. In addition, the current state of the art does not provide an accurate means to measure tip wear independent of manufacturing variations in tip length, for tips having single plane bend angles, or, especially, for tips having multiple plane bend angles.

The present disclosure overcomes the above deficiencies by providing inserts, measurement tools, and methods that enable improved accuracy in tip wear measurement, minimize user error, and enable use of a single tool for measurement of any configuration of insert tip, for both magnetostrictive and piezoelectric inserts, and for use across all manufactures.

The present disclosure enables, in aspects, the point of the insert tip to be utilized as a datum for measurement, thus enabling the use of a single tool for measurement of any configuration of insert tip, for both magnetostrictive and piezoelectric inserts, and for use across all manufactures.

The present disclosure provides, in aspects, a measurement tool that facilitates the evaluation of insert tip wear and includes, as a reference, a line for overlaying an insert tip and a wear threshold line. The present disclosure further provides, in aspects, a measurement tool including a resilient boot having a cavity or hole that receives a portion of an insert tip being evaluated. The depth of the tool cavity may establish the wear threshold.

The present disclosure further provides, in aspects, a tool holder for storage of measurement tool(s) and/or to facilitate placement of the insert tips into the measurement tools.

The details of the above aspects and other aspects and features of the present disclosure are described in greater detail below.

In accordance with aspects of the present disclosure, a dental ultrasonic tool configured to connect to a magnetostrictive or piezoelectric transducer of a dental instrument operating in the frequency range between 18 kHz and 50 kHz includes a tip and a singular surface marking having a minimum width of 0.5 mm. The singular surface marking is disposed on the tip and spaced-apart from a distal point of the tip, which is a datum. The singular surface marking defines at least one edge that is not coincident with a first flexural node of the tip at an operating frequency of the tip. The first flexural node is measured from the distal point of the tip along the tip in a mesial direction.

In aspects of the present disclosure, the singular surface marking extends circumferentially about the tip. In such aspects, the singular surface marking may be a circumferential band defining a leading end positioned from 4 mm to 6 mm from the distal point. Additionally or alternatively, the circumferential band may define a width of from 0.5 mm to 4 mm.

In another aspect of the present disclosure, the singular surface marking is laser etched, a TiN coating, vapor deposited, or otherwise formed.

In still another aspect of the present disclosure, the singular surface marking extends from 3 mm to 6 mm from the distal point.

In yet another aspect of the present disclosure, the singular surface marking extends from a mesial end of the tip to a leading surface that is spaced from 4 mm to 6 mm from the distal tip.

A dental ultrasonic tip wear measurement tool provided in accordance with aspects of the present disclosure includes a surface, a reference point disposed on the surface and configured for placement of a distal point (datum) of an ultrasonic dental tip thereon, a first reference line intersecting the reference point, a second reference line perpendicular to the first reference line, and a third reference line parallel to the first reference line. The second reference line is configured for alignment of a distal portion of the ultrasonic dental tip thereon. The third reference line is spaced-apart from the first reference line a distance equal to a wear threshold limit of the ultrasonic dental tip.

In an aspect of the present disclosure, a card, e.g., a rectangular card, defines the surface.

In another aspect of the present disclosure, the second reference line intersects the first reference line at the reference point and also intersects the third reference line.

In yet another aspect of the present disclosure, the third reference line is differentiated from the first and second reference lines, e.g., via line color, line style, and/or in any other suitable manner.

Still another dental ultrasonic tip wear measurement tool provided in accordance with the present disclosure includes a body defining a hole through a surface thereof into an interior thereof. The hole is configured to receive a distal portion of a dental ultrasonic tip. At least one dimension of the hole is complementary to at least one dimension of the distal portion of the dental ultrasonic insert tip to substantially constrain the distal portion of the dental ultrasonic tip within the hole in at least one direction. A wear threshold limit indicator is defined by or disposed on the body.

In an aspect of the present disclosure, wherein the surface defines the wear threshold limit indicator. In such aspects, the hole may define a cylindrical shape having a depth from 3 mm to 8 mm and a diameter from 0.40 mm to 1.5 mm.

In another aspect of the present disclosure, the body is translucent and at least one line is disposed on a side of the body offset from the surface. The at least one line defines the wear threshold limit indicator. In such aspects, the hole may define a cylindrical shape having a depth of at least 3 mm and wherein the at least one line is located between 3 mm and 8 mm from the bottom of the hole.

In still another aspect of the present disclosure, the body is cylindrical. The body may be resiliently flexible, e.g., defining a resilient boot, and may have a material hardness of 40 Shore A to 80 Shore A.

Other features, objects, and advantages of the techniques described in this disclosure will be apparent from the description and drawings, and from the claims. To the extent consistent, any of the aspects and features detailed herein may be used with any or all of the other aspects and features detailed herein.

BRIEF DESCRIPTION OF DRAWINGS

The above and other aspects and features of the present disclosure will become more apparent in view of the following detailed description when taken in conjunction with the accompanying drawings wherein like reference numerals identify similar or identical elements.

DETAILED DESCRIPTION

Aspects and features of the present disclosure are described hereinbelow with reference to the accompanying drawings. In the following descriptions, well known functions or constructions are summarily described or omitted entirely to avoid obscuring the present disclosure in unnecessary detail.

A dental ultrasonic insert, insert tip, or tip, is configured to connect to a magnetostrictive or piezoelectric transducer of an ultrasonic dental instrument (not shown) to drive a tip of the insert at ultrasonic frequencies to facilitate treating a patient's teeth. The transducer may operate in a frequency range of, for example, from 18 kHz to 50 kHz. When at an operating frequency, e.g., a frequency in the above-noted range, a tip of the dental ultrasonic insert defines a first flexural node therealong, as measured from a distal point of the tip along the tip in a mesial direction. As utilized herein, the terms "insert," "insert tip," and "tip" refer to components for use with any ultrasonic dental instrument, including both magnetostrictive and piezoelectric ultrasonic dental instruments.

Figure 1A:
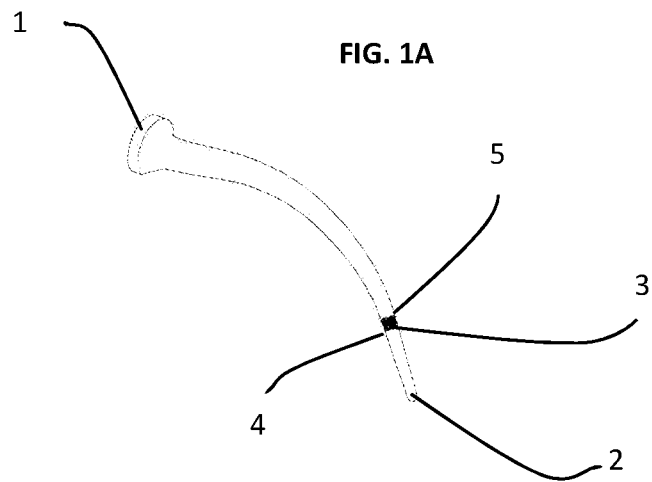
FIGS. 1A-1C are perspective views of various dental ultrasonic insert tips including surface markings in accordance with the present disclosure.
Figure 1B:
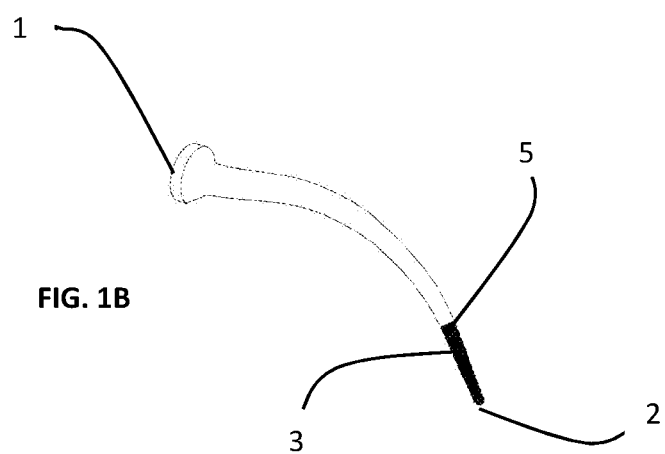
Figure 1C:
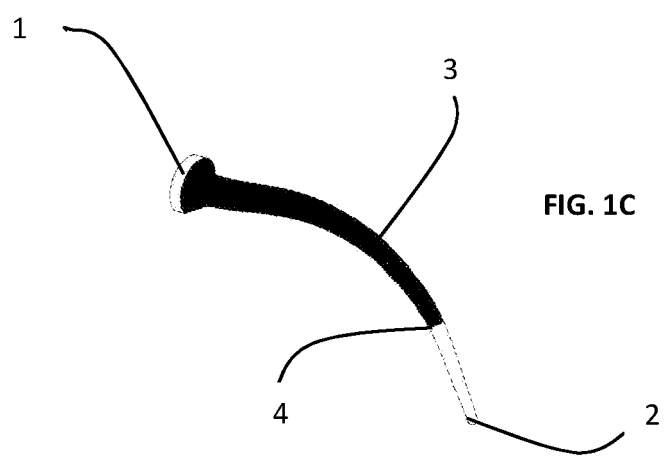

FIGS. 1A-1C illustrate various dental ultrasonic insert tips 1 provided in accordance with the present disclosure. Each of the insert tips 1 includes a singular, i.e., only one (1), surface marking 3 configured to facilitate evaluating tip wear. As detailed below, the location and configuration of the singular surface marking 3 is critical in enabling evaluation of tip wear; accordingly only a singular surface marking 3 is provided to avoid confusion and ensure accurate measurement using the appropriate reference points/lines. Insert tip 1 in FIG. 1A, for example, includes a surface marking 3 in the form of a circumferential band positioned a known distance from the point 2 of the insert tip 1. In FIG. 1A, the circumferential band defines the surface marking 3 and represents a measurement reference. The distance of the circumferential band from the point 2 of the tip 1 may be based on the geometry of a portion of the tip 1, e.g., a distal third of the tip, and/or on a location of the first flexural node of the insert tip 1.

Continuing with reference to FIG. 1A, the insert tip 1 being evaluated, as noted above, includes a circumferential band a known distance from the point 2 of the insert tip 1, this circumferential band defining the surface marking 3 that represents the measurement reference for wear threshold measurement. Either the leading end 4 or the trailing end of the circumferential band may serve as the measurement reference. The circumferential band may define a minimum thickness to act as a line, or may define any other thickness, fixed or varied.

Figure 5:
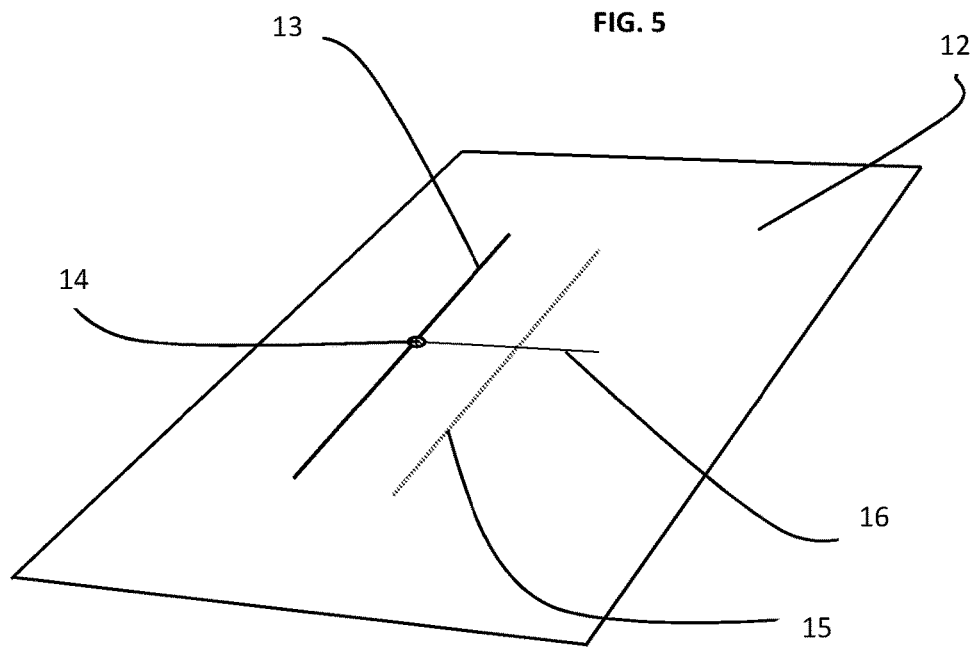
FIG. 5 is a perspective view of yet another measurement tool for measuring dental ultrasonic insert tip wear in accordance with the present disclosure.
Figure 6:
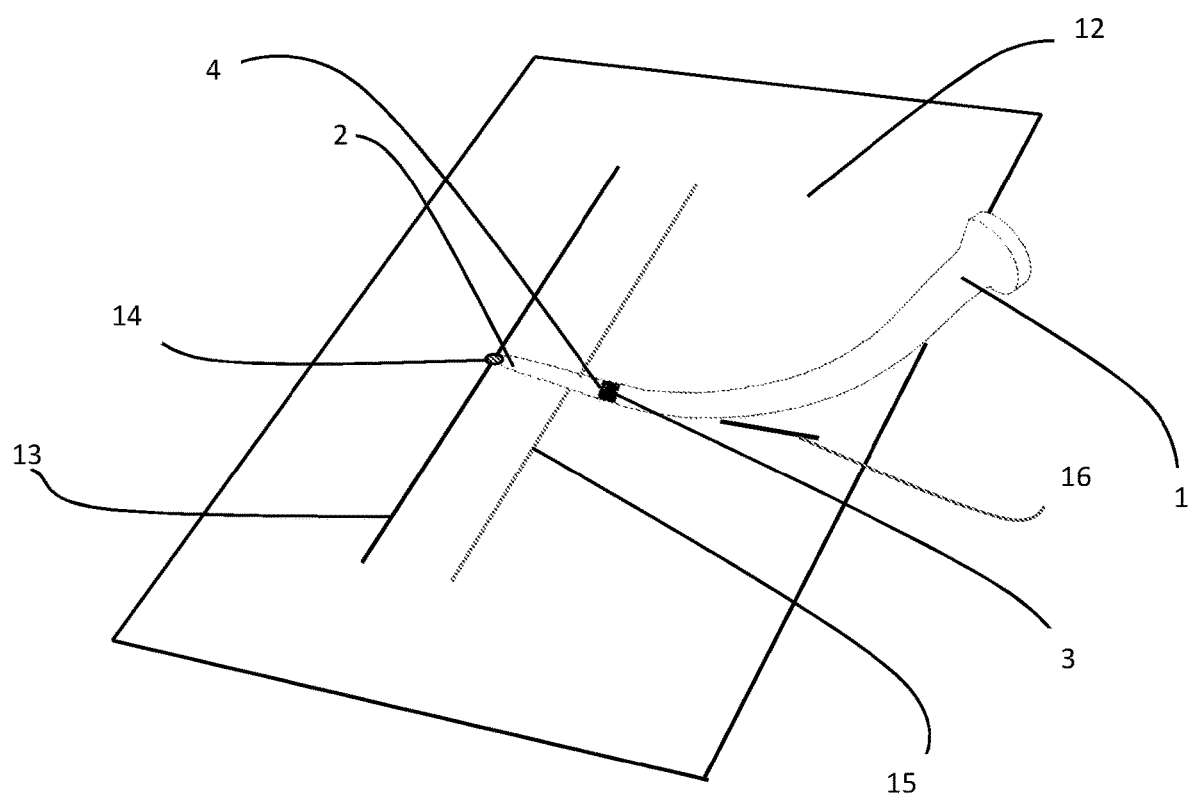
FIG. 6 is a perspective view of the measurement tool of FIG. 5 including a dental ultrasonic insert tip including a surface marking, such as the insert tips of FIG. 1A-1C or any other suitable insert tip, operably positioned on the measurement tool.

With additional reference to FIGS. 5 and 6, to measure wear, e.g., of insert tip 1 of FIG. 1A, in connection with an insert tip wear measurement tool 12 in the form of a card, the insert tip 1 being evaluated is positioned such that the point 2 of the tip 1 is placed on the measurement datum 14, e.g., a dot disposed on a first parallel reference line 13. In this manner, the point 2 of the tip 1 serves as the reference datum for the insert tip 1. The tip 1 is then aligned along a perpendicular reference line 16 using the axis of a portion, e.g., the distal third portion, of the tip 1 as a guide. The evaluation of the wear threshold may be determined by the position of the leading edge 4 of the surface marking 3, e.g., the circumferential band, although, as noted above, the trailing edge may also be utilized. The wear threshold is determined to be exceeded when the leading edge 4 touches, lays on, or extends beyond the second parallel reference line 15, which is spaced apart from and parallel to the first parallel reference line 13. The distance between the first and second parallel reference lines 13, 15, respectively, corresponds to the wear threshold distance from the leading edge 4 of the surface marking 3, e.g., the circumferential band, to the tip 1.

Turning back to FIG. 1B, in embodiments, the surface marking 3 is shading of a portion of the insert tip 1 beginning at the distal point 2 of the insert tip 1 and extending a known distance to a trailing edge 5 of the surface marking 3. In the configuration of a shaded surface marking 3 illustrated in FIG. 1B, the trailing edge 5 of the shading represents the measurement reference. With additional reference again to FIGS. 5 and 6, reaching the wear threshold is determined by positioning the tip 1 being evaluated such that the point 2 of the tip 1 is placed on the measurement datum 14, e.g., a point, on the first parallel reference line 13 such that the point 2 serves as the datum. The tip 1 is then aligned along the perpendicular reference line 16 using the axis of a portion, e.g., the distal third portion, of the tip 1 as a guide. The evaluation of the wear threshold is determined by the position of the trailing edge 5 (FIG. 1B) of the surface marking 3. Exceeding the wear threshold is demonstrated when the trailing edge 5 does not touch, lay on, or reach the second parallel reference line 15, e.g., where the trailing edge 5 is below the second parallel reference line 15. The distance between the first and second parallel reference lines 13, 15, respectively, corresponds to the wear threshold distance from the trailing edge 5 of the surface marking 3, e.g., the shading, to the tip 1.

Referring to FIG. 1C, in embodiments, the surface marking 3 is in the form of shading that starts at a farther-spaced point, e.g., at the mesial portion of the insert tip 1, and extends a known distance towards the distal point 2 of the tip 1 that is still spaced from the point 2 of the tip 1, e.g., such that the leading edge 4 of the surface marking 3 is spaced from the point 2 of the tip 1 and represents the measurement reference. In this configuration, with additional reference to FIGS. 5 and 6, reaching the wear threshold is determined first by placing the tip 1 being evaluated with the point 2 (e.g., the datum) thereof on the measurement datum 14, aligning the tip 1 along the perpendicular reference line 16 using the axis of a portion, e.g., the distal third portion, of the tip 1 as a guide, and evaluating the wear threshold. Evaluation of the wear threshold is determined by the position of the leading edge 4 (FIG. 1C) of the surface marking 3. Exceeding the wear threshold is determined when the leading edge 4 touches, lays on, or lies beyond the second parallel reference line 15, similarly as detailed above.

Continuing with reference to FIG. 5, measurement tool 12, as detailed above, is configured as a card for universal measurement of tip wear for dental ultrasonic inert tips. On the card, or other suitable surface, various indicia are printed, imprinted, or otherwise marked. More specifically, the indicia include a first parallel reference line 13, a perpendicular line reference 16 that intersects (in perpendicular orientation) the first parallel reference line 13, at a point, which is indicated as a dot 14 or other suitable identifier. A second parallel reference line 15, parallel to and spaced-apart from the first parallel reference line 13, is a different color or otherwise distinguishable in line style (broken, continuous, thickness, etc.), from the other lines 13, 16. The space between lines 13 and 15 represents the wear threshold, e.g., the amount of wear at which replacement of the insert tip 1 is recommended.

Figure 2A:
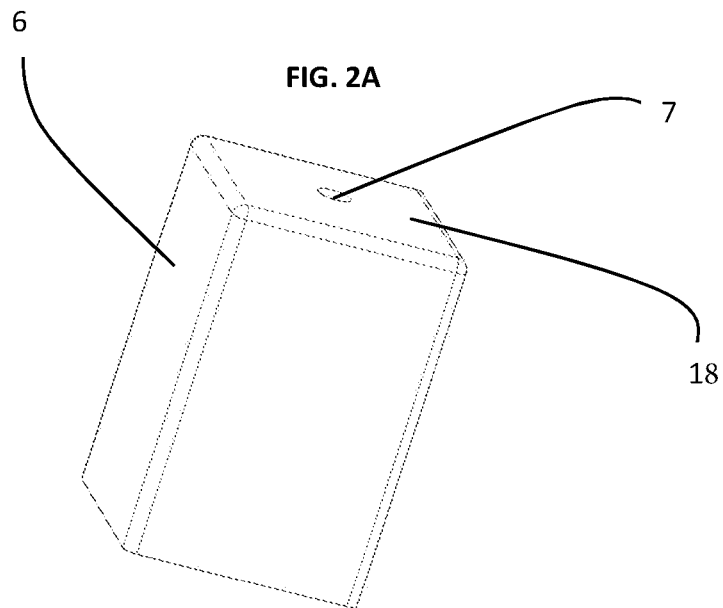
FIG. 2A is a perspective view of a measurement tool for measuring dental ultrasonic insert tip wear in accordance with the present disclosure.

Turning to FIG. 2A, another embodiment of a measurement tool is identified as measurement tool 6. Measurement tool 6 includes a body formed as a block, cube, cylinder, or other suitable configuration; the body is shown in FIG. 2A as a block. The block of the measurement tool 6 defines a hole 7 through a face surface 18 thereof. The depth of the hole 7 extending into the body of the measurement tool 6 corresponds to the wear threshold. Further, the dimensions of the hole 7 are complementary to (e.g., within 10% of the dimensions of) the dimensions of the distal portion of the dental ultrasonic insert tip configured for receipt within the hole 7. In this manner, the block body substantially constrains (e.g., limits movement in a direction to 10% or less of the dimension in that direction) axial and lateral movement of the distal portion of the dental ultrasonic insert tip during measurement, thus facilitating accurate measurement.

Figure 2B:
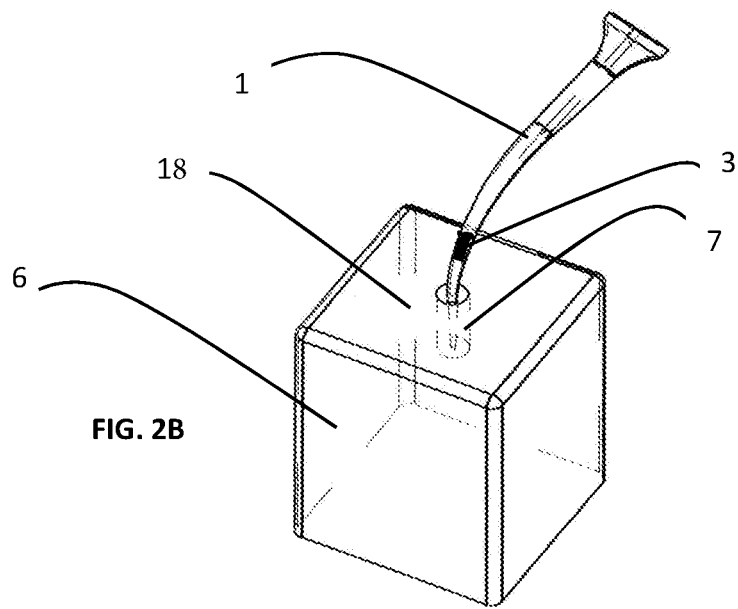
FIG. 2B is a perspective view of the measurement tool of FIG. 2A including a dental ultrasonic insert tip including a surface marking, such as the insert tips of FIG. 1A-1C or any other suitable insert tip, inserted in the measurement tool.

With additional reference to FIG. 2B, the wear of an insert tip 1 is evaluated by inserting the point of the tip 1 into the hole 7 until the point of the tip 1 bottoms out in the hole 7 and, at that point, observing whether the surface marking 3 is below the face surface 18, e.g., where the surface marking 3 extends into the hole 7, or whether the surface marking 3 is above the face surface 18, e.g., where the surface marking 3 is outside the hole 7. Where other surface markings 3 are utilized, the manner of determination may change, similarly as detailed above. In other embodiments, the body (or at least a portion of the body) of the measurement tool 6 may be translucent (or transparent) and including a wear threshold marking on one or more sides/portions thereof. In such configurations, the tip wear is determined to have exceeded the wear threshold if the surface markings 3 on the tip 1 are observed (through the translucent (or transparent) body) to be touching, laying on, or lying below (depending on the type of surface marking) the wear threshold marking on the body of the measurement tool.

Figure 3:
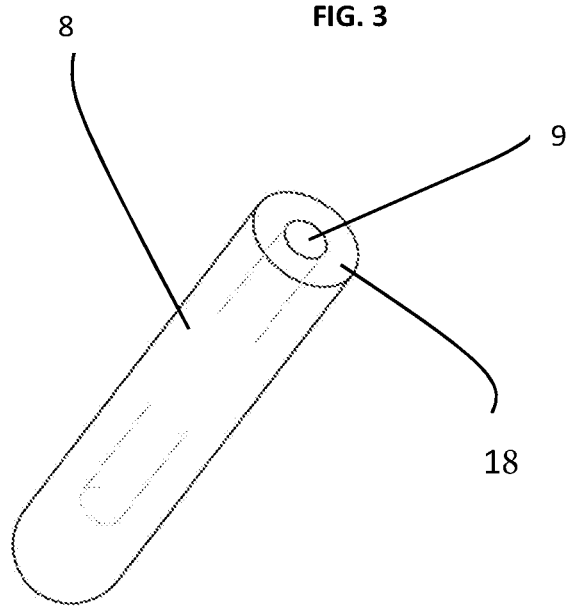
FIG. 3 is a perspective view of another measurement tool for measuring dental ultrasonic insert tip wear in accordance with the present disclosure.

Referring to FIG. 3, still another embodiment of a measurement tool is shown identified in FIG. 3 as measurement tool 8. Measurement tool 8 includes a resilient boot defining a hole 9. The resilient boot of measurement tool 8 is configured to receive a distal portion, e.g., the distal third portion, of an insert tip 1 (FIGS. 1A-1C) within hole 9 thereof until the point 2 of the insert tip 1 (FIGS. 1A-1C) bottoms out within the hole 9 of the resilient boot. The resilient boot is configured to resilient expand to receive the insert tip 1 and provide resilient return force to retain the insert tip 1 in position therein, thus inhibiting axial and lateral movement of the distal portion of the insert tip 1 during measurement and thereby facilitating accurate measurement.

The tip 1 is determined to have reached or exceeded its wear threshold when the leading edge 4 of the surface marking 3 (see, e.g., FIGS. 1A and 1C) is below the face surface 18, e.g., where the surface marking 3 extends into the hole 9, or whether the surface marking 3 is above the face surface 18, e.g., where the surface marking 3 is outside the hole 9 (see also FIGS. 1A and 1C). With respect to tip 1 of FIG. 1B, the tip 1 is determined to have reached or exceeded its wear threshold when the trailing edge 5 does not extend to or above the face surface 18, e.g., where the trailing edge 5 is not visible from an exterior of the measurement tool 8.

Figure 7A:
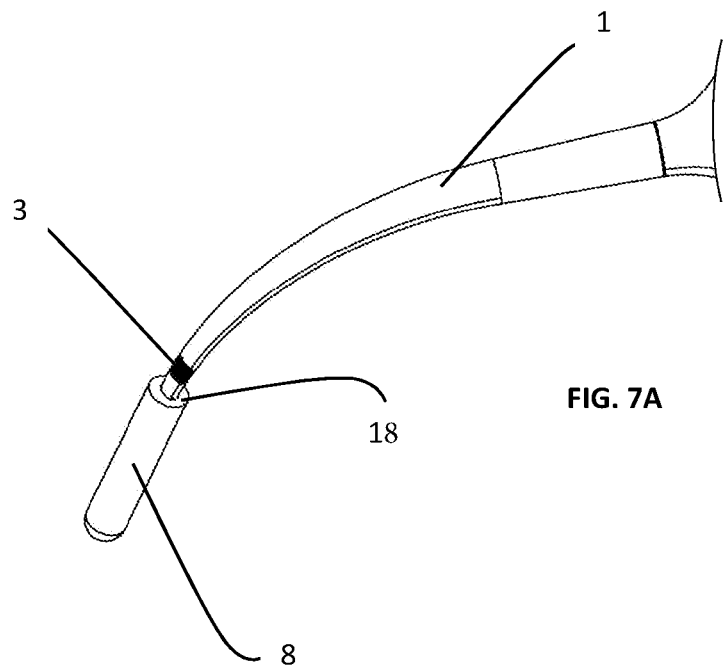
FIG. 7A is a perspective views of the measurement tool of FIG. 3 including a dental ultrasonic insert tip including a surface marking, such as the insert tips of FIG. 1A-1C or any other suitable insert tip, inserted in the measurement tool, wherein the insert tip has not yet been worn beyond a wear threshold.
Figure 7B:
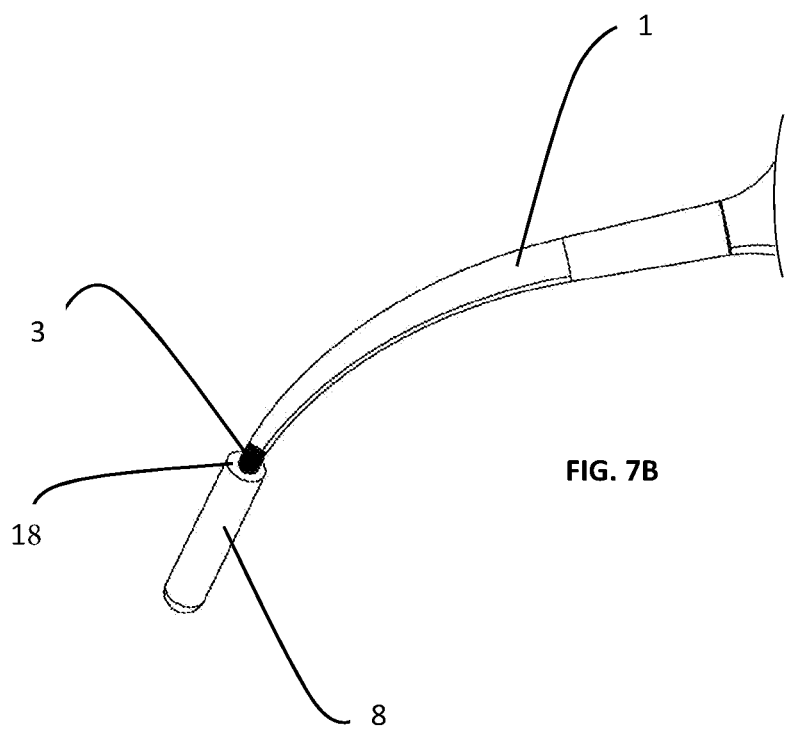
FIG. 7B is a perspective views of the measurement tool and insert tip illustrated in FIG. 7A, wherein the insert tip has been worn beyond the wear threshold.

With additional reference to FIGS. 7A and 7B, an example evaluation of the insert tip 1 illustrated in FIG. 1A, with the measurement tool 8 of FIG. 3 is illustrated. As shown in FIG. 7A, the insert tip 1 does not exceeding the wear threshold, as the leading edge 4 (FIG. 1A) of the surface marking 3 of the tip 1 does not yet reach or touch face surface 18, which corresponds to the wear threshold point. In FIG. 7B, on the other hand, the insert tip 1 of FIG. 1A exceeds the wear threshold, since the leading edge 4 (FIG. 1A) of the surface marking 3 of tip 1 at least reaches the face surface 18, if not extends through hole 9 (FIG. 3) into the resilient boot of the measurement device 8.

Figure 4:
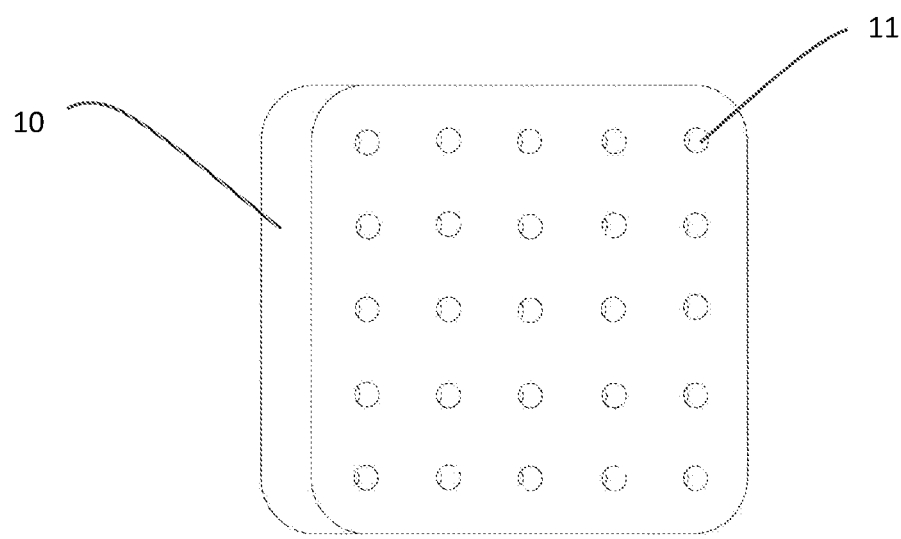
FIG. 4 is a tool holder configured to hold a plurality of measurement tools such as the measurement tool of FIG. 3 or any other suitable measurement tools in accordance with the present disclosure.

Turning to FIG. 4, a tool holder 10 is shown defining a plurality of holes 11 therethrough. Each hole 11 is configured to at least partially receive a measurement device, e.g., measurement device 8 (FIG. 3). In this manner, a plurality of measurement device 8 (FIG. 3) can be retained and presented in position, e.g., with hole 9 (FIG. 3) facing upwardly, for receipt of an insert tip for wear measurement. Although a matrix arrangement of holes 11 is shown, other suitable configurations are also contemplated, e.g., one or more circular arrangements of holes, a linear arrangement of holes, offset lines of holes, etc. Tool holder 10 may be formed from a more-rigid material as compared to the body of measurement device 8 (FIG. 3).

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques).

What is claimed is:

1. A dental ultrasonic tip wear measurement tool, comprising:
   a surface;
   a reference point marking disposed on the surface, the reference point marking indicating a placement location for a distal point of an ultrasonic dental tip;
   a first straight reference line intersecting the reference point marking;
   a second straight reference line perpendicular to the first straight reference line, the second straight reference line extending from the reference point marking and configured for alignment of a distal portion of the ultrasonic dental tip thereon, wherein the reference point marking is distinct from the first and second straight reference lines; and
   a third straight reference line parallel to the first reference line, perpendicular to the second straight reference line, and spaced-apart from the first straight reference line a distance equal to a wear threshold limit of the ultrasonic dental tip, the third straight reference line configured for comparison with a surface marking of the ultrasonic dental tip when the distal point of the ultrasonic dental tip is placed on the reference point marking and the distal portion of the ultrasonic dental tip is aligned on the second straight reference line to enable determination of wear of the ultrasonic dental tip.

2. The tool according to claim 1, further comprising a card defining the surface.

3. The tool according to claim 1, wherein the second straight reference line intersects the first straight reference line at the reference point and also intersects the third straight reference line.

4. The tool according to claim 1, wherein the third straight reference line is differentiated from the first and second straight reference lines.

5. The tool according to claim 4, wherein the third straight reference line is differentiated from the first and second straight reference lines by at least one of: line color or line style.

6. The tool according to claim 1, wherein the reference point marking is a dot printed on the surface.

* * * * *